US00RE41156E

(19) United States
(12) Reissued Patent
Gueret

(10) Patent Number: US RE41,156 E
(45) Date of Reissued Patent: Mar. 2, 2010

(54) NOTCHED BRUSH AND MAKE-UP DEVICE INCLUDING THIS BRUSH

(75) Inventor: Jean-Louis H. Gueret, Paris (FR)

(73) Assignee: L'Oreal S.A., Paris (FR)

(21) Appl. No.: 09/899,182

(22) Filed: Jul. 6, 2001

Related U.S. Patent Documents

Reissue of:
(64) Patent No.: 5,918,994
Issued: Jul. 6, 1999
Appl. No.: 08/863,193
Filed: May 27, 1997

(30) Foreign Application Priority Data

May 24, 1996 (FR) ..... 96-06515

(51) Int. Cl.
*A46B 11/00* (2006.01)
*A46B 9/02* (2006.01)

(52) U.S. Cl. ..... 401/129; 401/126; 401/122; 15/206; 132/218

(58) Field of Classification Search ..... 401/129, 401/122; 15/206; 132/218
See application file for complete search history.

(56) References Cited

U.S. PATENT DOCUMENTS

| | | | | | |
|---|---|---|---|---|---|
| 4,365,642 | A | | 12/1982 | Costa | |
| 4,403,624 | A | * | 9/1983 | Montgomery | 401/129 |
| 4,586,520 | A | | 5/1986 | Brittain | |
| 4,635,659 | A | | 1/1987 | Spatz | |
| 4,887,622 | A | * | 12/1989 | Gueret | 132/320 |
| 4,898,193 | A | | 2/1990 | Gueret | |
| 4,993,440 | A | * | 2/1991 | Gueret | 401/129 |
| 5,063,947 | A | * | 11/1991 | Gueret | 401/129 |
| 5,224,787 | A | | 7/1993 | Vasas | |
| 5,335,465 | A | * | 8/1994 | Gueret | 132/218 |
| 5,345,644 | A | * | 9/1994 | Gueret | 401/129 |
| 5,357,987 | A | | 10/1994 | Schrepf | |
| 5,542,439 | A | | 8/1996 | Gueret | |
| 5,551,456 | A | | 9/1996 | Hartel | |
| 5,595,198 | A | | 1/1997 | Kemmerer | |

FOREIGN PATENT DOCUMENTS

| | | |
|---|---|---|
| FR | 2 605 505 | 4/1988 |
| FR | 2 715 038 | 7/1995 |
| GB | 2 170 996 A | 8/1986 |
| JP | 5-88410 | 12/1993 |
| JP | 6-237818 | 8/1994 |
| JP | 8-33518 | 2/1996 |

OTHER PUBLICATIONS

English Language Abstract of JP 6–237818.
English Language Abstract of FR 2 605 505.
English Language Abstract of JP 8–33518.
English Language Abstract of FR 2 715 038

* cited by examiner

*Primary Examiner*—David J Walczak
(74) *Attorney, Agent, or Firm*—Finnegan, Henderson, Farabow, Garrett & Dunner, L.L.P.

(57) ABSTRACT

A brush has an elongate core, bristles fitted radially into this core, and at least one notch consisting of at least two secant faces defining by their intersection a trough line. The two faces are asymmetric and form an angle at any point of their intersection of between 60° and 180°.

339 Claims, 5 Drawing Sheets

NOTCHED BRUSH AND MAKE-UP DEVICE INCLUDING THIS BRUSH

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a brush, in particular to a brush for applying a cosmetic product to keratin fibers, especially for applying mascara to the eyelashes or a dye to the hair, as well as to a make-up device including this brush.

2. Description of the Related Art

Brushes are known, in particular from FR-A-2,605,505 and FR-A-2,715,038, for applying a cosmetic product which consists of a core into which bristles are fitted radially, these brushes having at least one concave notch which holds some of the product during wiping. Such brushes make it possible to vary the make-up, with more or less product being applied and a greater or lesser lengthening effect, depending on the shape of the notches and the way in which they are used. However, the notches have a continuous surface.

Also known, in particular from GB-A-2,170,996, are brushes for applying mascara to the eyelashes, these brushes having an alternating sequence of long bristles and short bristles forming a U-shaped notch. This type of brush only makes it possible to apply small quantities of mascara to the eyelash. Furthermore, the combing of the eyelashes and the spreading of the mascara on the eyelashes remains unsatisfactory.

SUMMARY OF THE INVENTION

Although these conventional brushes give results which are overall satisfactory, it is desirable to provide brushes which allow the eyelashes to penetrate the brush sufficiently to allow the product to be smoothed properly and the eyelashes to be separated properly. It is therefore an object of the invention to provide a brush for which application remains simple and economical, and which is practical to use.

This object is achieved, surprisingly, with the aid of a first aspect of the invention, namely a brush comprising an elongate core, bristles fitted radially into this core, and at least one notch consisting of at least two secant faces, of which a first face is referred to as the "notch back" and a second face is referred to as the "notch front", defining by their intersection a trough line, wherein the two faces are asymmetric and form a reentrant angle β, at any point of their intersection, of between 60° and 180°.

This brush can be used to comb and/or make up the hair, the eyelashes, the eyebrows, etc. The external surface of the brush is defined by the ends of the bristles of this brush. The envelope surface of the brush is defined as the surface containing the ends of the longest bristles of the brush. The central axis of the brush is the axis defined by the core of the brush. The intersection of the brush with any plane perpendicular to the core of the brush is defined by a plane section of the brush.

The reentrant angle β of intersection of the notch back and of the notch front of a given notch is defined, for each plane section of the brush, as the angle between the tangents of the two faces of the notch at the trough line. Advantageously, for any plane of cross-section of the brush, the reentrant angle β is between 90° and 160°, more preferably between 90° and 120°.

The intersection of the notch front of one notch with the envelope surface of the brush or with the notch back of a second notch defines a peak ridge and constitutes, at any point of intersection, the vertex of an emergent angle (α) whose two sides define a notch.

Preferably, the core is formed by the spiral winding of two branches of a wire, and the bristles are clamped between the wound branches of the core. Preferably, the notch back is plane or convex. Preferably, the notch front is plane or concave. According to the invention, the brush has one or more notches. Preferably, the notch or notches are obtained by trimming the brush.

The height h of the notch front for each plane of cross-section of the brush is defined as the distances between the intersection of this notch front with the envelope surface of the brush and the trough line. The value of h may vary along the axis of the core. The height H of the notch back for each plane section of the brush is defined as the distance between the intersection of this notch back with the envelope surface of the brush and the trough line. The value of H may vary along the axis of the core. Advantageously, in a given notch the notch front has a height less than the height of the notch back. Preferably, the notch front has a height of less than ⅔ of the height of the notch back, and more preferably less than ½ of the height of the notch back.

Each of the characteristics of this configuration (concavity of the faces, reentrant angle β and height of the faces) contributes to the formation of notches which are open, that is to say give open and progressive access to the trough line, the trough line being the region holding the greatest amount of mascara, then to the notch front which can support the eyelash over the entire height of this front in order to provide better spreading and combing. The notch may lie over all or part of the length of the brush, and the two faces preferably extend from one end of the brush to the other.

According to a variant of the invention, the trough line need not extend over the entire length of the brush, for example in at least one end of the brush the trough line stops before the end of the brush, either because the faces do not extend as far as this end, or because they marge into a continuous surface.

According to another variant of the invention, the notch or notches are of spiral shape, that is, the corresponding trough line and peak ridge may each have the shape of a spiral.

The longest bristles define the envelope surface of the brush. The brush may have any envelope surface: cylindrical, frustoconical, in the shape of a rugby ball, pyramidal, in the shape of a peanut, etc. It may consist of a plurality of sections with different envelope surfaces, for example a cylindrical brush ending in a frustoconical end. Thus, the brush may consist of at least two successive sections with different characteristics: sections with different envelope surfaces, sections which have notches and sections which do not. The peak ridges may optionally be trimmed so that they are rounded.

The shortest bristles of the trough line hold the greatest amount of mascara. Thus, when the user applies the brush to her eyelash, she can turn the brush between her fingers to vary the amount of mascara applied to the eyelash, with effective combing and spreading of the product. By imparting a translational movement to the brush along the eyelash, the user may also choose to increase the amount of mascara applied to the eyelash or to increase the combing, depending on the region of the brush which she applies to the eyelash.

A brush of this type makes it possible to obtain a make-up which is full-bodied, regular, elongated and curls. It is highly appropriate for making up the eyelashes, and so a second aspect of the invention provides a make-up device comprising a mascara reservoir and a mascara in the form of a brush as described above.

The brush preferably has a plurality of adjacent notches, with two neighboring notches defining between them, by their contours, at least one peak region of variable width (the width of a peak region being measured in a direction perpendicular to the centrol axis of the brush).

Furthermore, the bristles of the brushes according to the invention may be of any type: bristles with different heights, different diameters or different cross-sections and made of different materials, bristles with ends which are tapered, fork-shaped or pinhead-shaped, or which have been subjected to any type of treatment known to the person skilled in the art.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
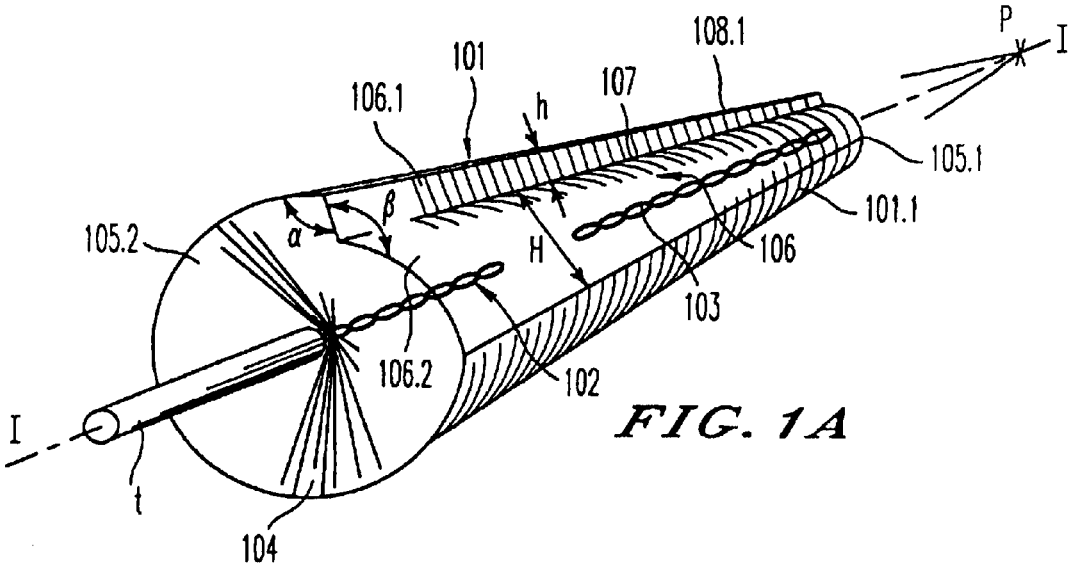
FIGS. 1A and 1B are a perspective and views of a brush according to the invention, having a single grooved notch.

FIG. 1 shows a brush 101 for applying a cosmetic product, in particular for applying mascara to the eyelashes, comprising an elongate core 102 (which has been shown in this Figure even though it is inside the brush) formed by the spiral winding of two branches of a wire 103 which was folded into a U-shape before the branches were twisted.

The core 102 is fixed by force-fitting a stem t at the end. Bristles 104 are fitted radially between the branches of the wire 103. When the branches of the wire 103 are twisted, the bristles are clamped and held between the spiral turns of the core 102. The axis of the core 102 may coincide with the axis 1—1 of the envelope surface 101.1 of the brush as in the Figures, but these two axes could be offset. The bristles 104 may be made of natural or synthetic and optionally flocculated fibers. The brush 101 may include a mixture of bristles of different types (different diameters, different cross-sections).

The envelope surface 101.1 of the brush is a cone frustum having a central axis I—I which coincides with the axis of the core 102, and has two ends constituting plane sections of the brush: the top section 105.1 of the front of the brush and its plane base 105.2 at the back of the brush. The brush has a notch 106 consisting of two secant faces: the notch front 106.1 and the notch back 106.2 extending from one end of the brush to the other.

The face 106.1 is straight and forms an emergent angle $\alpha$, constant over the entire length of the brush, with the envelope surface of the brush. The two faces 106.1 and 106.2 form between them a reentrant angle $\beta$–120° which is constant from one end of the brush to the other.

The face 106.2 is convex. The entire surface of the brush (conical surface 101.1 notch front 106.1 and notch back 106.2) contains of generatrices converging to a fixed point P lying on the central axis I—I of the brush.

The intersection of the two faces 106.1 and 106.2 defines a straight trough line 107 which also converges to P. The intersection of the notch front 106.1 with the envelope surface of the brush 101.1 defines a straight peak ridge 108.1 converging at P.

Figure 1B:
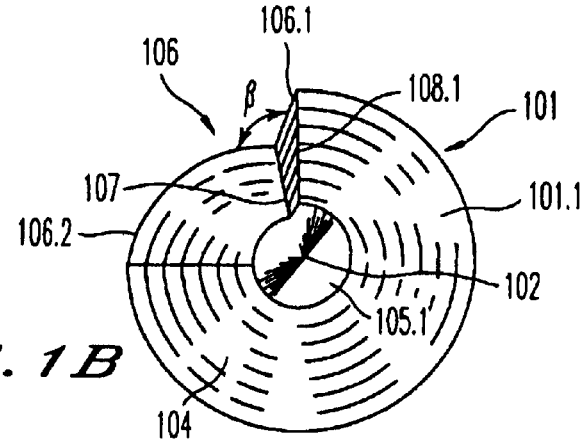

The notch back 106.2 of the brush 101 shown in FIGS. 1A and 1B is rounded, its radius being adjusted so that the notch back 106.2 is tangent to the envelope surface 101.1 of the brush, but according to a variant 106.2 and 101.1 may be chosen to be secant and to define a second peak ridge.

The notch front 106.1 has a height h, and the notch back has a height H, which vary along the core. The relationship $h<\frac{1}{2}H$ is satisfied in each plane section of the brush.

The notch 106 is obtained by trimming the brush 101, that is by cutting the bristles 104 with a clipper. The notch 106 lies on a single side of the brush, and so is not cut through the core 102.

Figure 10:
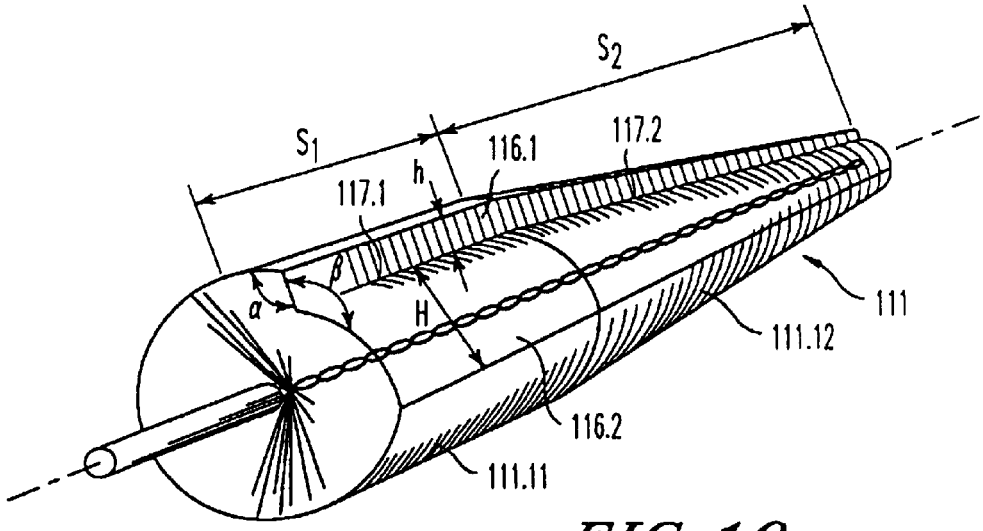
FIG. 10 is a perspective view of a variant of a brush according to the invention, having a cylindrical section and a conical section.

The brush 111 shows in FIG. 10 differs from the one shown in FIG. 1 in that it has two separate sections, one $S_1$ with a cylindrical envelope surface 111.11, and the other $S_2$ with a conical envelope surface 111.12 like that of the brush in FIG. 1, these two sections merging at their equal diameters. The notch front 116.1 and the notch back 116.2 extend over the two sections. Their respective heights h and H are constant over the entire cylindrical section $S_1$ then decrease along the conical section $S_2$. The angle $\beta$ between the notch front 116.1 and the notch back 116.2 is constant over the entire length of the brush. The trough line consists of two line segments: the line segment 117.1 in the cylindrical section, which is parallel to the axis of the core, and the line segment 117.2, in the conical section, which converges to a point lying on the axis of the core. A brush of this type allows beneficial make-up variations to be obtained.

Figure 2:
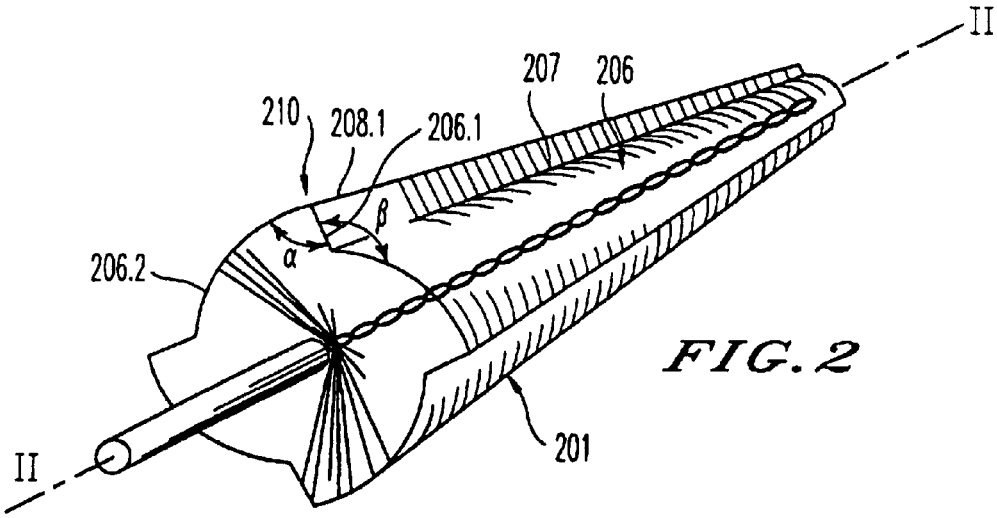
FIGS. 2 and 3 are perspective views of two alternative embodiments of brushes according to the invention.

The brush 201 shown in FIG. 2 differs from the one shown in FIGS. 1A and 1B in that it has four identical notches 206, each occupying an angular sector of 90° of the surface of the brush. The straight notch front 206.1 of one notch and the rounded notch back 206.2 of the preceding notch define together a notch 210 and a peak line 208.1. The surface of the brush 201 has 4 protruding notches separated by four trough lines 207, these notches being spaced from one another by a 90° rotation about the central axis II—II of the brush. An observer positioned at the stem side end of the brush sees a succession of notches oriented to the right; in a given notch 210, the straight notch front 206.1 is placed to the right of the rounded notch back 206.2. The pitch of the brush is thus right-handed.

According to a variant of the invention, provision may also be made for the pitch to be left-handed. Provision may also be made for the brush to have two successive sections: one with a left-handed pitch and the other with a right-handed pitch. The pitch is preferably the same over the entire length of the brush.

Figure 3:
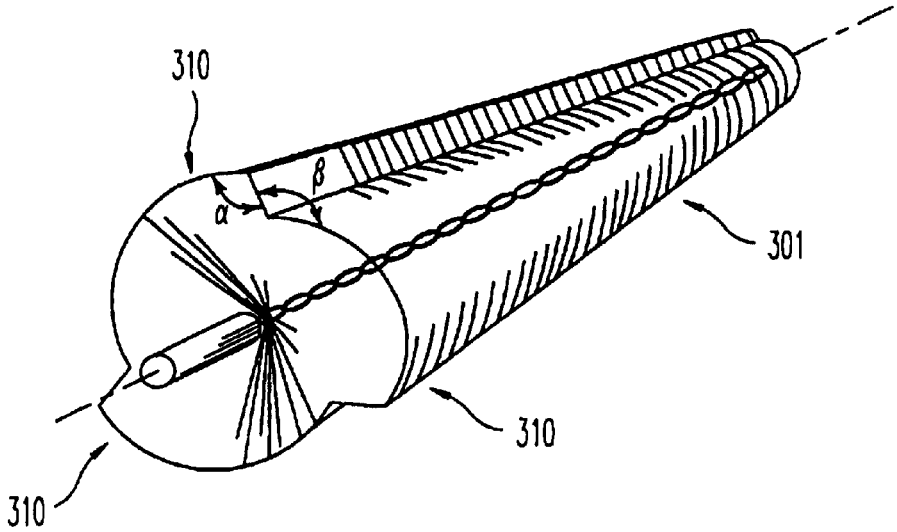

The brush 301 shown in FIG. 3 differs from the brush in FIG. 2 in that it has three notches 310, each occupying an angular sector of 120°.

The brushes shown in FIGS. 2 and 3 have regular adjacent notches, that is, the cone is divided into an integer number of equal angular sectors (a number equal to the number of notches), each of these angular sectors being bounded by 2 peak ridges and 2 trough ridges of two successive notches, the notches being derived from one another by rotating the brush about its central axis. However, provision may be made for the notches to be irregular: unequal angular sectors, notches with different characteristics.

Figure 4:
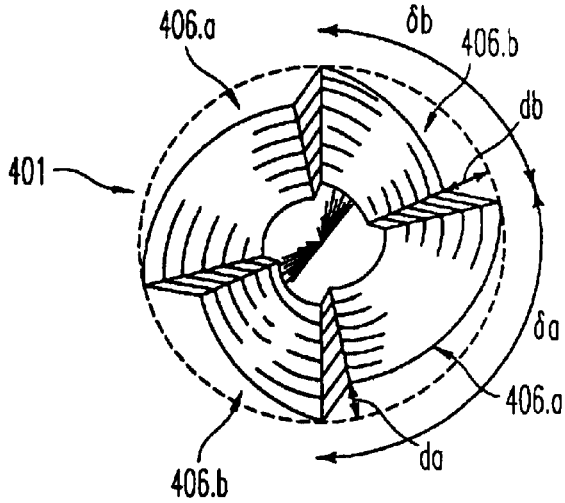
FIGS. 4 and 5 are end views of two variants of brushes according to the invention, along the central axis of these brushes.

For example, FIG. 4 shows a brush 401 according to the invention which differs from the one shown in FIG. 2 in that two successive notches have neither the same depth nor the same angular width: in each plane section of the brush, the depth of the notch is measured as the distance from the trough line to the envelope surface. The angular width of a notch is the angle between the ridge lines delimiting this notch. The notches are irregular; a notch 406.a of depth da (variable along the axis of the core) and angular width δa alternates with a notch 406.b of depth db (variable along the axis of the core) and angular width δb, with:

da>db, and

δa>δb.

Figure 5:
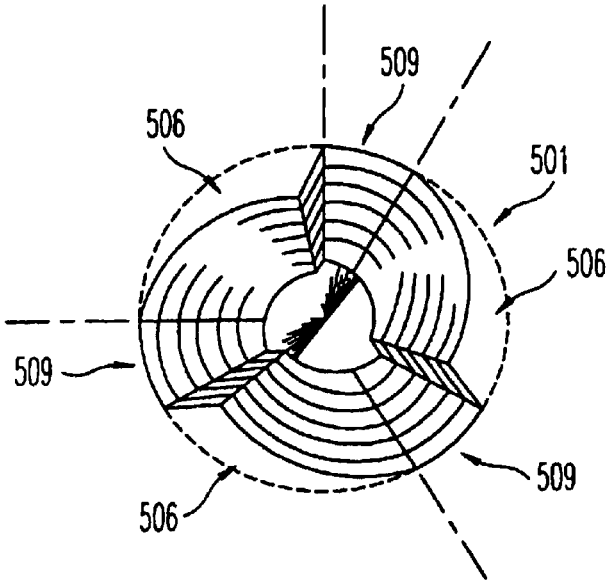

Provision may also be made for the notches to be separated and not adjacent, which has the result that, on the surface of the brush, uncut spaces or peak regions of the envelope surface are left between two successive notches. This possibility is illustrated by FIG. 5, which shows a brush 501 according to the invention which has an alternating sequence of peak regions 509 and notches 506.

Figure 6:
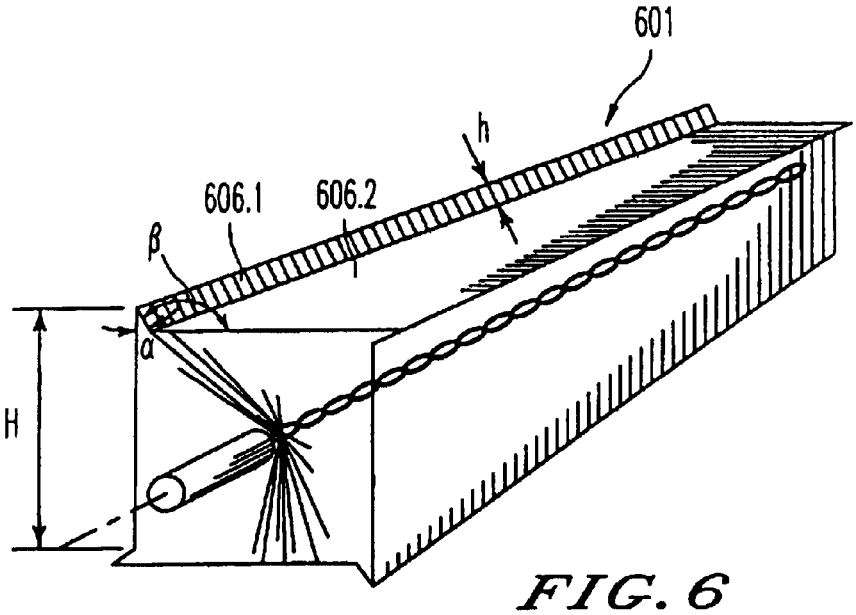
FIGS. 6, 7 and 8 are perspective views of variants of brushes according to the invention, with different envelope surfaces.

The brush 601 shown in FIG. 6 differs from the one shown in FIG. 2 in that it has a surface with parallel generatrices (convergence point P at infinity) and that the notch backs 606.2 are plane. The trough lines are parallel to the generatrices of the brush. This brush can be obtained from a cylindrically shaped brush into which the straight faces are cut. The angle β between the notch back 606.2 and the notch front 606.1 satisfies: 90°<β<120°. In this Figure, the heights h and H of the faces 606.1 and 606.2, respectively, are constant over the entire length of the brush. According to a variant of the invention, h and H may be varied along the central axis of the brush. The emergent angle α and reentrant angle β are constant over the entire length of the brush.

Figure 7:
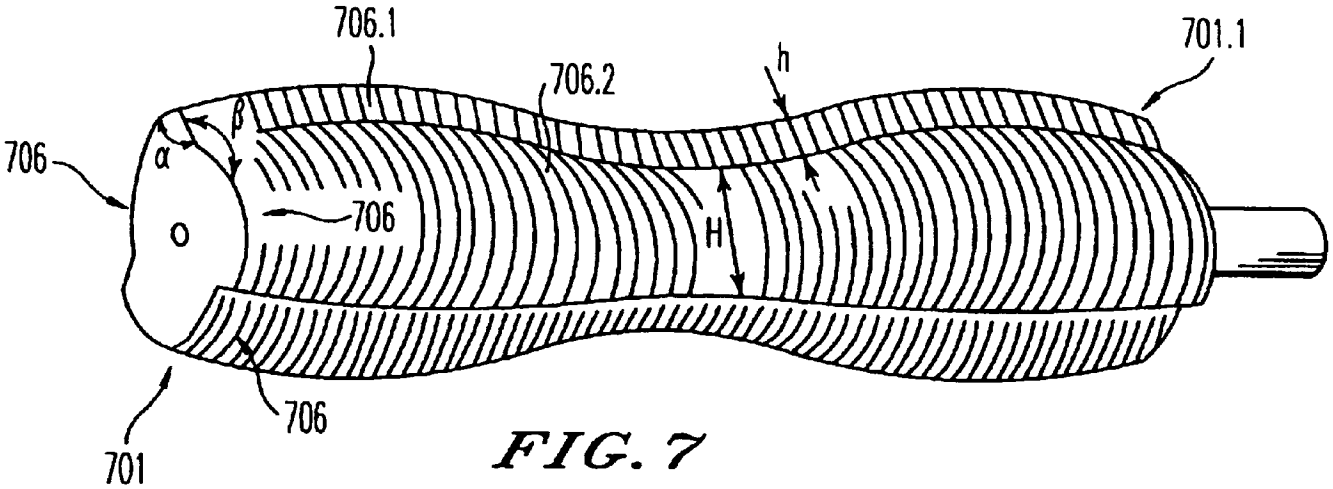

The brush 701 shown in FIG. 7 differs from the one shown in FIG. 2 in that it has an envelope surface 701.1 having the shape of a peanut. It has three regular adjacent notches 706. The notch fronts 706.1 are plane and have a height h which is constant over the entire length of the central axis of the brush. The notch backs 706.2 are rounded. The height of the notch backs H, which is variable along the central axis of the brush, satisfies H>2h in any cross-section of the brush. The angle β between the notch back 706.2 and the notch front 706.1 is constant along the axis of the core and satisfies: 90°<β<160°.

Figure 8:
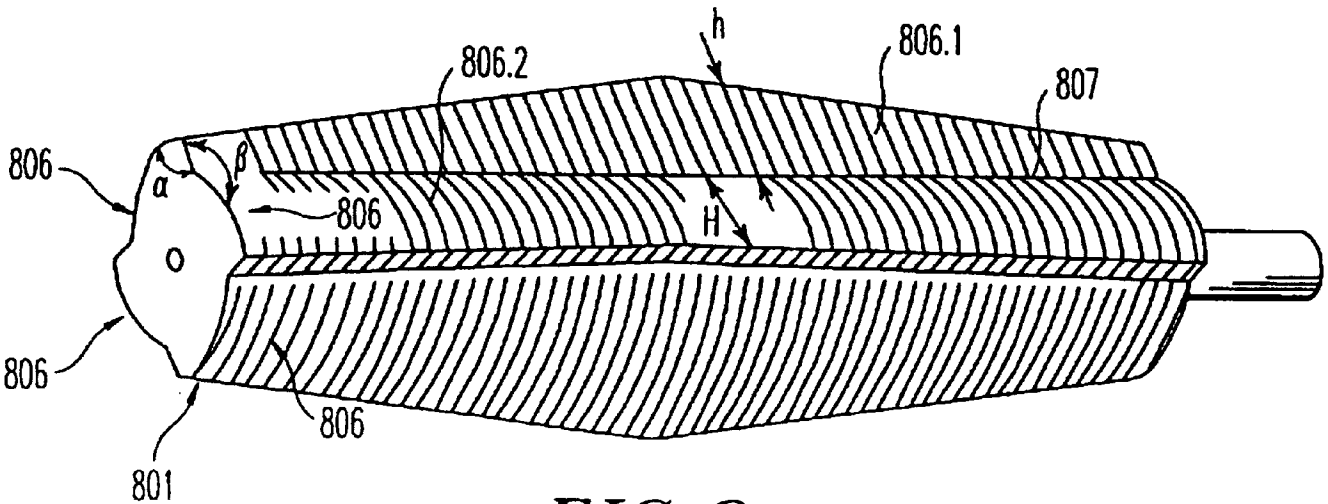

The brush 801 shown in FIG. 8 differs from the one shown in FIG. 2 in that it has an envelope surface having the shape of two cone frustums assembled via their bases of equal diameter. It has four regular adjacent notches 806, each consisting of a plane notch front 806.1 and a rounded notch back 806.2. The trough line 807 is a straight line parallel to the central axis of the brush. The angle β between the notch back 806.2 and the notch front 806.1 is constant along the axis of the core and satisfies: 90°<β<160°.

Figure 11:
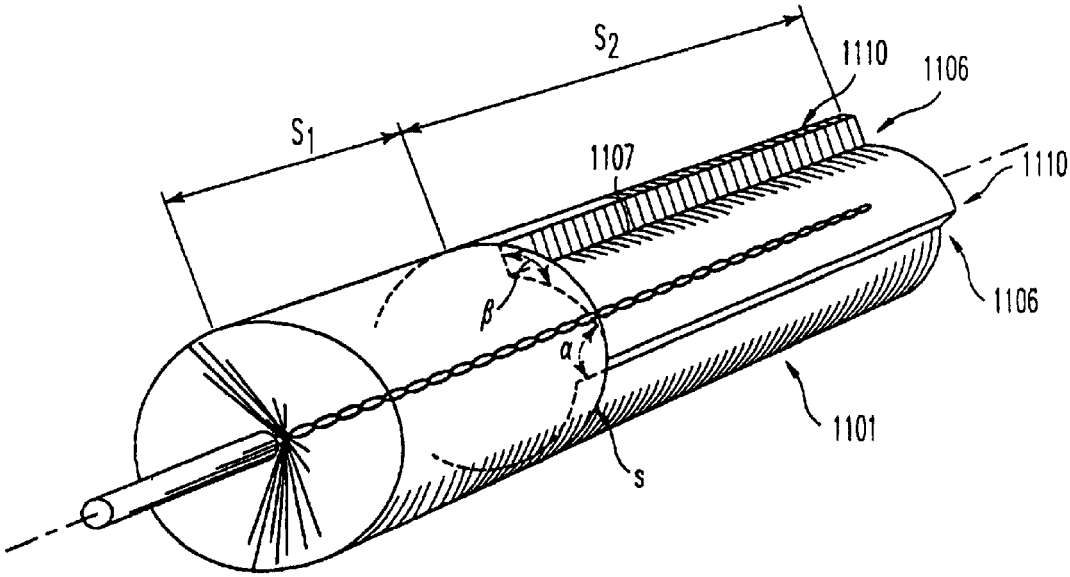
FIG. 11 shows a variant of a brush according to the invention, having a first section which is free of notches and a second section which has notches.

The brush 1101 according to the invention and shown in FIG. 11 differs from the ones shown in FIGS. 1 to 8 in that it has two separate successive actions S1 and S2. Along the entire section S1, the brush has a cylindrical shape and is free of notches. Along the section S2, the envelope surface of the brush is cylindrical, with an axis coinciding with the central axis of the brush and the same diameter as the cylinder. Over the entire length S2 are regular adjacent cut-outs 1106 which have straight trough lines 1107, parallel to the central axis of the brush, and forming regular adjacent notches 1110. The cross-section s is at the intersection of S1 and S2. The trough lines 1107 are segments of lines which, like the cuts 1106 and the notches 1110, are interrupted at s.

Figure 9:
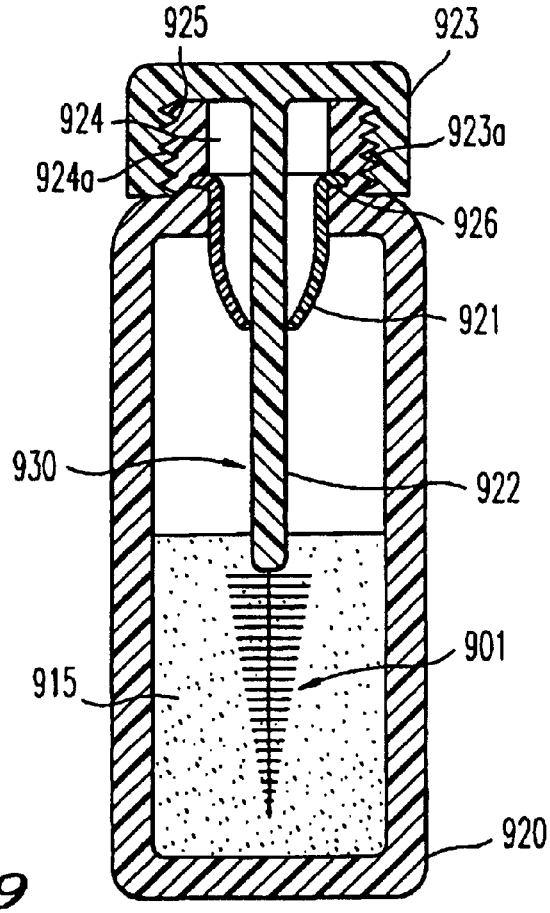
FIG. 9 is a sectional view of a device for eye make-up according to the second aspect of the invention.

The eye make-up device shown in FIG. 9 comprises a cylindrical reservoir 920 which has a threaded neck 924 topped by a seal 925, and which is fitted with mascara 915. The reservoir 920 has a wiping constriction 921 in its neck, the wiping constriction being held in position in the neck by a head 926 which interacts with the shoulder separating the neck from the reservoir 920 proper. In a known fashion, the wiping constriction 921 is made of a flexible and elastic material.

An applicator intended to interact with the reservoir 920 consists of a gripping means 923 which supports the application element 930 and comprises a stem 922 and a brush 901 corresponding to those shown in FIG. 1. The gripping means 923 has the shape of a cap with a screw thread 923a which interacts with the screw thread 924a of the neck of the reservoir. The reservoir 920 is closed in leak-tight fashion by screwing the gripping means 923 onto the neck 924 of the reservoir.

When the application element 930 is extracted from the reservoir, the brush loaded with mascara passes through the wiping constriction 921. This wipes the long bristles of the peak regions much more than the short bristles (around the trough line) of the notch. During application to the eyelash, the notch supports the eyelash via the notch front, in particular via its peak ridge, in the manner of a comb, and separates and combs the hairs of the eyelash, then the notch back supports the eyelash as far as the trough line while applying mascara to the base of the hairs of the eyelash, which a second notch has just spread.

In comparison with the known notched brushes, the brush according to the invention provides the advantage of allowing support by the notches for styling and curling the hairs of the eyelash, which is more effective than in brushes with rounded concave notches. Furthermore, the fact that the notches are open allows better access to the product held around the trough line.

Obviously, numerous modifications and variations of the present invention are possible in light of the above teachings. It is therefore to be understood that the invention may be practiced otherwise than as specifically described herein.

What is claimed is:

1. A brush comprising:

an elongate core defining a central axis of the brush;

bristles fitted radially into said core, the ends of said bristles defining the external surface of the brush, and the ends of the longest ones of the bristles defining an envelope surface;

at least one notch in the external surface of the brush and comprising at least two secant faces, a first of said faces defining a non-concave notch back and having a height which varies along the axis, and a second of said faces defining a notch front and having a height which varies along the axis, said secant faces defining at their intersection a trough line, wherein the intersection of the notch front of one notch with the envelope surface of the brush or with the notch back of a second notch defines a peak ridge forming the vertex of an emergent angle (α), wherein the two secant faces are asymmetric and form a reentrant angle (β) of between 60° and 180° at any point along the trough line.

2. The brush according to claim 1, wherein the core is formed by the spiral winding of two branches of a wire, and wherein the bristles are clamped between the wound branches of the core.

3. The brush according to claim 1, wherein each notch is obtained by trimming the brush.

4. The brush according to claim 1, wherein the two faces extend from one end of the brush to the other.

5. The brush according to claim 1, wherein the reentrant angle of the two faces of each notch is between 90° and 160°.

6. The brush according to claim 1, wherein the notch front is plane.

7. The brush according to claim 1, wherein the notch front is convex.

8. The brush according to claim 1, wherein the height of each notch front is less than the height of the corresponding notch back.

9. The brush according to claim 8, wherein the height of each notch front is less than ⅔ of the height of the corresponding notch back.

10. The brush according to claim 1, wherein the envelope surface of the brush is a cone frustum.

11. The brush according to claim 1, wherein at least one of the notch front and notch back is straight.

12. The brush according to claim 1, wherein the emergent angle (α) is constant over the entire length of the brush.

13. The brush according to claim 1, wherein the reentrant angle (β) is constant from one end of the brush to the other.

14. The brush according to claim 1, wherein the external surface of the brush consists entirely of generatrices converging to a fixed point (P).

15. The brush according to claim 1, wherein the trough line is straight.

16. The brush according to claim 15, wherein the trough line converges to the same point (P) as the generatrices of the surface of the brush.

17. The brush according to claim 15, wherein the peak ridge converges to the same point (P) as the generatrices of the surface of the brush.

18. The brush according to claim 1, wherein the peak ridge is straight.

19. The brush according to claim 1, wherein the notch back is rounded and has a radius such that the notch back is tangent to the envelope surface of the brush.

20. The brush according to claim 1, comprising a plurality of said notches.

21. The brush according to claim 20, wherein the notches are adjacent to one another.

22. The brush according to claim 20, wherein the notches are regularly spaced.

23. The brush according to claim 1, wherein the trough line extends over only a part of the length of the brush.

24. The brush according to claim 1, wherein each notch is of spiral shape.

25. A make-up device comprising:

a mascara reservoir;

a wiping constriction; and a mascara applicator comprising an elongate core defining a central axis, bristles fitted radially into said core, the ends of said bristles defining an external surface, and the ends of the longest ones of the bristles defining an envelope surface, at least one notch in the external surface and comprising at least two secant faces, a first of said faces defining a non-concave notch back and having a height which varies along the axis, and a second of said faces defining a notch front and having a height which varies along the axis, said secant faces defining at their intersection a trough line, wherein the intersection of the notch front of one notch with the envelope surface or with the notch back of a second notch defines a peak ridge forming the vertex of an emergent angle (α), wherein the two secant faces are asymmetric and forms a reentrant angle (β) of between 60° and 180° at any point along the trough line.

26. A brush comprising:

an elongate core;

bristles fitted radially into said core, the ends of said bristles defining the external surface of the brush, and the ends of the longest ones of the bristles defining an envelope surface;

at least one notch in the external surface of the brush and comprising at least two secant faces, a first of said faces defining a notch back, and a second of said faces defining a notch front, wherein said notch back is at least in part non-concave, said secant faces defining at their intersection a trough line extending in a direction which is not perpendicular to the length of said elongate core, wherein the intersection of the notch front of one notch with the envelope surface of the brush or with the notch back of a second notch defines a peak ridge forming the vertex of an emergent angle (α), wherein the two secant faces are asymmetric and form a reentrant angle (β) of between 60° and 180° at any point along the trough line.

27. A make-up device comprising:

a mascara reservoir;

a wiping constriction; and a mascara applicator comprising an elongate core, bristles fitted radially into said core, the ends of said bristles defining an external surface, and the ends of the longest ones of the bristles defining an envelope surface, at least one notch in the external surface and comprising at least two secant faces, a first of said faces defining a notch back, and a second of said faces defining a notch front, wherein said notch back is at least in part non-concave, said secant faces defining at their intersection a trough line extending in a direction which is not perpendicular to the length of said elongate core, wherein the intersection of the notch front of one notch with the envelope surface or with the notch back of a second notch defines a peak ridge forming the vertex of an emergent angle (α), wherein the two secant faces are asymmetric and form a reentrant angle (β) of between 60° and 180° at any point along the trough line.

28. A brush comprising:

an elongate core;

bristles fitted radially into said core, the ends of said bristles defining the external surface of the brush, and the ends of the longest ones of the bristles defining an envelope surface;

at least one notch in the external surface of the brush and comprising at least two secant faces, a first of said faces defining a notch back, and a second of said faces defining a notch front, wherein said notch back is non-concave, said secant faces defining at their intersection a trough line extending in a direction which is not perpendicular to the length of said elongate core, wherein the intersection of the notch front of one notch with the envelope surface of the brush or with the notch back of a second notch defines a peak ridge forming the vertex of an emergent angle (α), wherein the two secant faces are asymmetric and form a reentrant angle (β) of between 60° and 180° at any point along the trough line.

29. A make-up device comprising:

a mascara reservoir;

a wiping constriction; and a mascara applicator comprising an elongate core, bristles fitted radially into said core, the ends of said bristles defining an external surface, and the ends of the longest ones of the bristles defining an envelope surface, at least one notch in the external surface and comprising at least two secant faces, a first of said faces defining a notch back, and a second of said faces defining a notch front, wherein said notch back is non-concave, said secant faces defining a notch at their intersection a trough line extending in a direction which is not perpendicular to the length of said elongate core, wherein said intersection of the notch front of one notch with the envelope surface or with the notch back of a second notch defines a peak ridge forming the vertex of an emergent angle (α), wherein the two secant faces are asymmetric and forms a reentrant angle (β) of between 60° and 180° at any point along the trough line.

*30. The brush according to claim 1, wherein the notch back of the at least one notch is defined by bristles of varying lengths.*

*31. The brush according to claim 1, wherein the notch back of the one notch intersects with the envelope surface.*

*32. The brush according to claim 1, wherein the at least one notch comprises at least two notches, and wherein the notch back of the one notch intersects with an outer edge of the notch front of another notch.*

*33. The brush according to claim 32, wherein said another notch is said second notch.*

*34. The brush according to claim 32, wherein said another notch is not said second notch.*

*35. The brush according to claim 30, wherein the notch back of the one notch intersects with the envelope surface.*

*36. The brush according to claim 30, wherein the at least one notch comprises at least two notches, and wherein the notch back of the one notch intersects with an outer edge of the notch front of another notch.*

*37. The brush according to claim 36, wherein said another notch is said second notch.*

*38. The brush according to claim 36, wherein said another notch is not said second notch.*

*39. The make-up device according to claim 25, wherein the notch back of the at least one notch is defined by bristles of varying lengths.*

*40. The make-up device according to claim 25, wherein the notch back of the one notch intersects with the envelope surface.*

*41. The make-up device according to claim 25, wherein the at least one notch comprises at least two notches, and wherein the notch back of the one notch intersects with an outer edge of the notch front of another notch.*

*42. The make-up device according to claim 41, wherein said another notch is said second notch.*

*43. The make-up device according to claim 41, wherein said another notch is not said second notch.*

*44. The make-up device according to claim 39, wherein the notch back of the one notch intersects with the envelope surface.*

*45. The make-up device according to claim 39, wherein the at least one notch comprises at least two notches, and wherein the notch back of the one notch intersects with an outer edge of the notch front of another notch.*

*46. The make-up device according to claim 45, wherein said another notch is said second notch.*

*47. The make-up device according to claim 45, wherein said another notch is not said second notch.*

*48. The brush according to claim 26, wherein the notch back of the at least one notch is defined by bristles of varying lengths.*

*49. The brush according to claim 26, wherein the notch back of the one notch intersects with the envelope surface.*

*50. The brush according to claim 26, wherein the at least one notch comprises at least two notches, and wherein the notch back of the one notch intersects with an outer edge of the notch front of another notch.*

*51. The brush according to claim 50, wherein said another notch is said second notch.*

*52. The brush according to claim 50, wherein said another notch is not said second notch.*

*53. The brush according to claim 48, wherein the notch back of the one notch intersects with the envelope surface.*

*54. The brush according to claim 48, wherein the at least one notch comprises at least two notches, and wherein the notch back of the one notch intersects with an outer edge of the notch front of another notch.*

*55. The brush according to claim 54, wherein said another notch is said second notch.*

*56. The brush according to claim 54, wherein said another notch is not said second notch.*

*57. The make-up device according to claim 27, wherein the notch back of the at least one notch is defined by bristles of varying lengths.*

*58. The make-up device according to claim 27, wherein the notch back of the one notch intersects with the envelope surface.*

*59. The make-up device according to claim 27, wherein the at least one notch comprises at least two notches, and wherein the notch back of the one notch intersects with an outer edge of the notch front of another notch.*

*60. The make-up device according to claim 59, wherein said another notch is said second notch.*

*61. The make-up device according to claim 59, wherein said another notch is not said second notch.*

*62. The make-up device according to claim 57, wherein the notch back of the one notch intersects with the envelope surface.*

*63. The make-up device according to claim 57, wherein the at least one notch comprises at least two notches, and wherein the notch back of the one notch intersects with an outer edge of the notch front of another notch.*

*64. The make-up device according to claim 63, wherein said another notch is said second notch.*

*65. The make-up device according to claim 63, wherein said another notch is not said second notch.*

*66. The brush according to claim 28, wherein the notch back of the at least one notch is defined by bristles of varying lengths.*

*67. The brush according to claim 28, wherein the notch back of the one notch intersects with the envelope surface.*

*68. The brush according to claim 28, wherein the at least one notch comprises at least two notches, and wherein the notch back of the one notch intersects with an outer edge of the notch front of another notch.*

*69. The brush according to claim 68, wherein said another notch is said second notch.*

*70. The brush according to claim 68, wherein said another notch is not said second notch.*

*71. The brush according to claim 66, wherein the notch back of the one notch intersects with the envelope surface.*

*72. The brush according to claim 66, wherein the at least one notch comprises at least two notches, and wherein the notch back of the one notch intersects with an outer edge of the notch front of another notch.*

*73. The brush according to claim 72, wherein said another notch is said second notch.*

*74. The brush according to claim 72, wherein said another notch is not said second notch.*

*75. The make-up device according to claim 29, wherein the notch back of the at least one notch is defined by bristles of varying lengths.*

*76. The make-up device according to claim 29, wherein the notch back of the one notch intersects with the envelope surface.*

*77. The make-up device according to claim 29, wherein the at least one notch comprises at least two notches, and wherein the notch back of the one notch intersects with an outer edge of the notch front of another notch.*

*78. The make-up device according to claim 77, wherein said another notch is said second notch.*

*79. The make-up device according to claim 77, wherein said another notch is not said second notch.*

*80. The make-up device according to claim 75, wherein the notch back of the one notch intersects with the envelope surface.*

*81. The make-up device according to claim 75, wherein the at least one notch comprises at least two notches, and wherein the notch back of the one notch intersects with an outer edge of the notch front of another notch.*

*82. The make-up device according to claim 81, wherein said another notch is said second notch.*

*83. The make-up device according to claim 81, wherein said another notch is not said second notch.*

*84. A brush comprising:*

*an elongate core;*

*bristles extending from said core, ends of said bristles defining an external surface of the brush; and*

*at least one notch on the external surface of the brush, the at least one notch comprising a front face and a back face, the back face being non-concave and asymmetric with respect to the front face,*

*wherein the front and back faces of the at least one notch intersect one another at a trough line that is spaced away from the core, and*

*wherein the back face of the at least one notch is defined by bristles having varying lengths.*

*85. The brush according to claim 84, wherein the front and back faces of the at least one notch are separate and continuous surfaces.*

*86. The brush according to claim 84, wherein the ends of the longest of the bristles define an envelope surface of the brush.*

*87. The brush according to claim 86, wherein an outer edge of the front face of the at least one notch intersects with the envelope surface, and wherein the back face of the at least one notch intersects with the envelope surface.*

*88. The brush according to claim 84, wherein the at least one notch comprises at least two notches, wherein an outer edge of the front face of one notch intersects with the back face of a second notch, and wherein the back face of the one notch intersects with an outer edge of the front face of another notch.*

*89. The brush according to claim 88, wherein said another notch is said second notch.*

*90. The brush according to claim 88, wherein said another notch is not said second notch.*

*91. The brush according to claim 84, wherein the elongate core defines an axis of the brush, and wherein a height of the front face of the at least one notch varies along the axis and a height of the back face of the at least one notch varies along the axis.*

*92. The brush according to claim 87, wherein the intersection of the outer edge of the front face of the at least one notch with the envelope surface defines a peak ridge.*

*93. The brush according to claim 88, wherein the intersection of the outer edge of the front face of the at least one notch with the back face of the second notch defines a peak ridge.*

*94. The brush according to claim 92, wherein the peak ridge forms a vertex of an emergent angle $\alpha$, and wherein the front and back faces of the at least one notch form a reentrant angle $\beta$ of between 60° and 180° at any point along the trough line.*

*95. The brush according to claim 93, wherein the peak ridge forms a vertex of an emergent angle $\alpha$, and wherein the front and back faces of the at least one notch form a reentrant angle $\beta$ of between 60° and 180° at any point along the trough line.*

*96. The brush according to claim 84, wherein the core is formed by the spiral winding of two branches of a wire, and wherein the bristles are clamped between the wound branches of the core.*

*97. The brush according to claim 84, wherein the front and back faces of the at least one notch extend from one end of the brush to the other.*

*98. The brush according to claim 84, wherein the front and back faces of the at least one notch extend along only a part of a length of the brush.*

*99. The brush according to claim 94, wherein the reentrant angle is between 90° and 160°.*

*100. The brush according to claim 95, wherein the reentrant angle is between 90° and 160°.*

*101. The brush according to claim 84, wherein at least one of the front face and the back face of the at least one notch is planar.*

*102. The brush according to claim 101, wherein the front face of the at least one notch is planar.*

*103. The brush according to claim 84, wherein the back face of the at least one notch is convex.*

*104. The brush according to claim 102, wherein the back face of the at least one notch is planar.*

*105. The brush according to claim 102, wherein the back face of the at least one notch is convex.*

*106. The brush according to claim 84, wherein a height of the front face of each notch is less than a height of the corresponding back face of each notch.*

*107. The brush according to claim 106, wherein the height of the front face of each notch is less than ⅔ of the height of the corresponding back face of each notch.*

*108. The brush according to claim 84, wherein a cross-section of the brush is substantially rectangularly shaped.*

*109. The brush according to claim 84, wherein a cross-section of the brush is substantially circularly shaped.*

*110. The brush according to claim 94, wherein the emergent angle $\alpha$ is constant over the entire length of the brush.*

*111. The brush according to claim 95, wherein the emergent angle $\alpha$ is constant over the entire length of the brush.*

*112. The brush according to claim 94, wherein the reentrant angle $\beta$ is constant from one end of the brush to the other.*

*113. The brush according to claim 95, wherein the reentrant angle β is constant from one end of the brush to the other.*

*114. The brush according to claim 84, wherein the trough line is straight.*

*115. The brush according to claim 84, wherein the trough line is curved.*

*116. The brush according to claim 92, wherein the peak ridge is straight.*

*117. The brush according to claim 93, wherein the peak ridge is straight.*

*118. The brush according to claim 92, wherein the peak ridge is curved.*

*119. The brush according to claim 93, wherein the peak ridge is curved.*

*120. The brush according to claim 87, wherein the back face of the at least one notch is rounded and has a radius such that the back face is tangent to the envelope surface of the brush.*

*121. The brush according to claim 84, wherein the at least one notch comprises a plurality of said notches.*

*122. The brush according to claim 121, wherein the notches are adjacent to one another.*

*123. The brush according to claim 121, wherein the notches are regularly spaced.*

*124. The brush according to claim 84, wherein the trough line extends over only a part of a length of the brush.*

*125. A make-up device comprising:*

*a reservoir for containing a make-up product;*

*a wiping member associated with the reservoir; and*

*the brush according to claim 84.*

*126. The make-up device of claim 125, further comprising mascara contained in the reservoir.*

*127. A brush comprising:*

*an elongate core;*

*bristles extending from said core, ends of said bristles defining an external surface of the brush; and*

*at least one notch on the external surface of the brush, the at least one notch comprising a front face and a back face, the back face being at least in part non-concave and asymmetric with respect to the front face,*

*wherein the front and back faces of the at least one notch intersect one another at a trough line that is spaced away from the core, the trough line extending in a direction non-perpendicular to the length of said elongate core, and*

*wherein the back face of the at least one notch is defined by bristles having varying lengths.*

*128. The brush according to claim 127, wherein the front and back faces of the at least one notch are separate and continuous surfaces.*

*129. The brush according to claim 127, wherein the ends of the longest of the bristles define an envelope surface of the brush.*

*130. The brush according to claim 129, wherein an outer edge of the front face of the at least one notch intersects with the envelope surface, and wherein the back face of the at least one notch intersects with the envelope surface.*

*131. The brush according to claim 127, wherein the at least one notch comprises at least two notches, wherein an outer edge of the front face of one notch intersects with the back face of a second notch, and wherein the back face of the one notch intersects with an outer edge of the front face of another notch.*

*132. The brush according to claim 131, wherein said another notch is said second notch.*

*133. The brush according to claim 131, wherein said another notch is not said second notch.*

*134. The brush according to claim 127, wherein the elongate core defines an axis of the brush, and wherein a height of the front face of the at least one notch varies along the axis and a height of the back face of the at least one notch varies along the axis.*

*135. The brush according to claim 130, wherein the intersection of the outer edge of the front face of the at least one notch with the envelope surface defines a peak ridge.*

*136. The brush according to claim 131, wherein the intersection of the outer edge of the front face of the at least one notch with the back face of the second notch defines a peak ridge.*

*137. The brush according to claim 135, wherein the peak ridge forms a vertex of an emergent angle α, and wherein the front and back faces of the at least one notch form a reentrant angle β of between 60° and 180° at any point along the trough line.*

*138. The brush according to claim 136, wherein the peak ridge forms a vertex of an emergent angle α, and wherein the front and back faces of the at least one notch form a reentrant angle β of between 60° and 180° at any point along the trough line.*

*139. The brush according to claim 127, wherein the core is formed by the spiral winding of two branches of a wire, and wherein the bristles are clamped between the wound branches of the core.*

*140. The brush according to claim 127, wherein the front and back faces of the at least one notch extend from one end of the brush to the other.*

*141. The brush according to claim 127, wherein the front and back faces of the at least one notch extend along only a part of a length of the brush.*

*142. The brush according to claim 137, wherein the reentrant angle is between 90° and 160°.*

*143. The brush according to claim 138, wherein the reentrant angle is between 90° and 160°.*

*144. The brush according to claim 127, wherein at least one of the front face and the back face of the at least one notch is planar.*

*145. The brush according to claim 144, wherein the front face of the at least one notch is planar.*

*146. The brush according to claim 127, wherein the back face of the at least one notch is convex.*

*147. The brush according to claim 145, wherein the back face of the at least one notch is planar.*

*148. The brush according to claim 145, wherein the back face of the at least one notch is convex.*

*149. The brush according to claim 127, wherein a height of the front face of each notch is less than a height of the corresponding back face of each notch.*

*150. The brush according to claim 149, wherein the height of the front face of each notch is less than ⅔ of the height of the corresponding back face of each notch.*

*151. The brush according to claim 127, wherein a cross-section of the brush is substantially rectangularly shaped.*

*152. The brush according to claim 127, wherein a cross-section of the brush is substantially circularly shaped.*

*153. The brush according to claim 137, wherein the emergent angle α is constant over the entire length of the brush.*

*154. The brush according to claim 138, wherein the emergent angle α is constant over the entire length of the brush.*

*155. The brush according to claim 137, wherein the reentrant angle β is constant from one end of the brush to the other.*

*156. The brush according to claim 138, wherein the reentrant angle β is constant from one end of the brush to the other.*

*157. The brush according to claim 127, wherein the trough line is straight.*

*158. The brush according to claim 127, wherein the trough line is curved.*

*159. The brush according to claim 135, wherein the peak ridge is straight.*

*160. The brush according to claim 136, wherein the peak ridge is straight.*

*161. The brush according to claim 135, wherein the peak ridge is curved.*

*162. The brush according to claim 136, wherein the peak ridge is curved.*

*163. The brush according to claim 130, wherein the back face of the at least one notch is rounded and has a radius such that the back face is tangent to the envelope surface of the brush.*

*164. The brush according to claim 127, wherein the at least one notch comprises a plurality of said notches.*

*165. The brush according to claim 164, wherein the notches are adjacent to one another.*

*166. The brush according to claim 164, wherein the notches are regularly spaced.*

*167. The brush according to claim 127, wherein the trough line extends over only a part of a length of the brush.*

*168. A make-up device comprising:*

*a reservoir for containing a make-up product;*

*a wiping member associated with the reservoir; and*

*the brush according to claim 127.*

*169. The make-up device of claim 168, further comprising mascara contained in the reservoir.*

*170. A brush comprising:*

*an elongate core;*

*bristles extending from said core, ends of said bristles defining an external surface of the brush, the ends of the longest of the bristles defining an envelope surface of the brush; and*

*at least one notch on the external surface of the brush, the at least one notch comprising a front face and a back face, the back face being non-concave and asymmetric with respect to the front face,*

*wherein the front and back faces of the at least one notch intersect one another at a trough line that is spaced away from the core,*

*wherein an outer edge of the front face of one notch intersects with the envelope surface of the brush, and*

*wherein the back face of the one notch intersects with the envelope surface of the brush.*

*171. The brush according to claim 170, wherein the front and back faces of the at least one notch are separate and continuous surfaces.*

*172. The brush according to claim 170, wherein the elongate core defines an axis of the brush, and wherein a height of the front face of the at least one notch varies along the axis and a height of the back face of the at least one notch varies along the axis.*

*173. The brush according to claim 170, wherein the intersection of the outer edge of the front face of the at least one notch with the envelope surface defines a peak ridge.*

*174. The brush according to claim 173, wherein the peak ridge forms a vertex of an emergent angle α, and wherein the front and back faces of the at least one notch form a reentrant angle β of between 60° and 180° at any point along the trough line.*

*175. The brush according to claim 170, wherein the core is formed by the spiral winding of two branches of a wire, and wherein the bristles are clamped between the wound branches of the core.*

*176. The brush according to claim 170, wherein the front and back faces of the at least one notch extend from one end of the brush to the other.*

*177. The brush according to claim 170, wherein the front and back faces of the at least one notch extend along only a part of a length of the brush.*

*178. The brush according to claim 174, wherein the reentrant angle is between 90° and 160°.*

*179. The brush according to claim 170, wherein at least one of the front face and the back face of the at least one notch is planar.*

*180. The brush according to claim 179, wherein the front face of the at least one notch is planar.*

*181. The brush according to claim 170, wherein the back face of the at least one notch is convex.*

*182. The brush according to claim 180, wherein the back face of the at least one notch is planar.*

*183. The brush according to claim 180, wherein the back face of the at least one notch is convex.*

*184. The brush according to claim 170, wherein a height of the front face of each notch is less than a height of the corresponding back face of each notch.*

*185. The brush according to claim 184, wherein the height of the front face of each notch is less than ⅔ of the height of the corresponding back face of each notch.*

*186. The brush according to claim 170, wherein a cross-section of the brush is substantially rectangular.*

*187. The brush according to claim 170, wherein a cross-section of the brush is substantially circular.*

*188. The brush according to claim 174, wherein the emergent angle α is constant over the entire length of the brush.*

*189. The brush according to claim 174, wherein the emergent angle β is constant from one end of the brush to the other.*

*190. The brush according to claim 170, wherein the trough line is straight.*

*191. The brush according to claim 170, wherein the trough line is curved.*

*192. The brush according to claim 173, wherein the peak ridge is straight.*

*193. The brush according to claim 173, wherein the peak ridge is curved.*

*194. The brush according to claim 170, wherein the back face of the at least one notch is rounded and has a radius such that the back face is tangent to the envelope surface of the brush.*

*195. The brush according to claim 170, wherein the at least one notch comprises a plurality of said notches.*

*196. The brush according to claim 195, wherein the notches are adjacent to one another.*

*197. The brush according to claim 195, wherein the notches are regularly spaced.*

*198. The brush according to claim 170, wherein the trough line extends over only a part of a length of the brush.*

*199. A make-up device comprising:*

*a reservoir for containing a make-up product;*

*a wiping member associated with the reservoir; and*

*the brush according to claim 170.*

*200. The make-up device of claim 199, further comprising mascara contained in the reservoir.*

*201. A brush comprising:*

*an elongate core;*

*bristles extending from said core, ends of said bristles defining an external surface of the brush; and*

*at least two notches on the external surface of the brush, the at least two notches each comprising a front face, a*

*back face, and a trough line, the back face being non-concave and asymmetric with respect to the front face,*

*wherein the front and back faces of each of the at least two notches intersect one another at the trough line that is spaced away from the core,*

*wherein an outer edge of the front face of one notch intersects with the back face of a second notch, and*

*wherein the back face of the one notch intersects with an outer edge of the front face of another notch.*

*202. The brush according to claim 201, wherein the front and back faces of the at least two notches are separate and continuous surfaces.*

*203. The brush according to claim 201, wherein said another notch is said second notch.*

*204. The brush according to claim 201, wherein said another notch is not said second notch.*

*205. The brush according to claim 201, wherein the elongate core defines an axis of the brush, and wherein a height of the front face of the at least two notches varies along the axis and a height of the back face of the at least two notches varies along the axis.*

*206. The brush according to claim 201, wherein the intersection of the outer edge of the front face of the one notch and the back face of the second notch defines a peak ridge.*

*207. The brush according to claim 206, wherein the peak ridge forms a vertex of an emergent angle α, and wherein the front and back faces of the at least two notches form a reentrant angle β of between 60° and 180° at any point along the trough line.*

*208. The brush according to claim 201, wherein the core is formed by the spiral winding of two branches of a wire, and wherein the bristles are clamped between the wound branches of the core.*

*209. The brush according to claim 201, wherein the front and back faces of the at least two notches extend from one end of the brush to the other.*

*210. The brush according to claim 201, wherein the front and back faces of the at least two notches extend along only a part of a length of the brush.*

*211. The brush according to claim 207, wherein the reentrant angle is between 90° and 160°.*

*212. The brush according to claim 201, wherein at least one of the front face and the back face of the at least two notches is planar.*

*213. The brush according to claim 212, wherein the front face of the at least two notches is planar.*

*214. The brush according to claim 201, wherein the back face of the at least two notches is convex.*

*215. The brush according to claim 213, wherein the back face of the at least two notches is planar.*

*216. The brush according to claim 213, wherein the back face of the at least two notches is convex.*

*217. The brush according to claim 201, wherein a height of the front face of each notch is less than a height of the corresponding back face of each notch.*

*218. The brush according to claim 217, wherein the height of the front face of each notch is less than ⅔ of the height of the corresponding back face of each notch.*

*219. The brush according to claim 201, wherein a cross-section of the brush is substantially rectangularly shaped.*

*220. The brush according to claim 201, wherein a cross-section of the brush is substantially circularly shaped.*

*221. The brush according to claim 207, wherein the emergent angle α is constant over the entire length of the brush.*

*222. The brush according to claim 207, wherein the reentrant angle β is constant from one end of the brush to the other.*

*223. The brush according to claim 201, wherein the trough line is straight.*

*224. The brush according to claim 201, wherein the trough line is curved.*

*225. The brush according to claim 206, wherein the peak ridge is straight.*

*226. The brush according to claim 206, wherein the peak ridge is curved.*

*227. The brush according to claim 201, wherein ends of the longest of the bristles define an envelope surface of the brush, and wherein the back face of at least one of the at least two notches is rounded and has a radius such that the back face is tangent to the envelope surface of the brush.*

*228. The brush according to claim 201, wherein the notches are adjacent to one another.*

*229. The brush according to claim 201, wherein the notches are regularly spaced.*

*230. The brush according to claim 201, wherein the trough line extends over only a part of a length of the brush.*

*231. A make-up device comprising:*

*a reservoir for containing a make-up product;*

*a wiping member associated with the reservoir; and*

*the brush according to claim 201.*

*232. The make-up device of claim 231, further comprising mascara contained in the reservoir.*

*233. A brush comprising:*

*an elongate core;*

*bristles extending from said core, ends of said bristles defining an external surface of the brush, the ends of the longest of the bristles defining an envelope surface of the brush; and*

*at least one notch on the external surface of the brush, the at least one notch comprising a front face and a back face, the back face being at least in part non-concave and asymmetric with respect to the front face,*

*wherein the front and back faces of the at least one notch intersect one another at a trough line that is spaced away from the core, the trough line extending in a direction non-perpendicular to the length of said elongate core, and*

*wherein an outer edge of the front face of one notch intersects with the envelope surface of the brush, and*

*wherein the back face of the one notch intersects with the envelope surface of the brush.*

*234. The brush according to claim 233, wherein the front and back faces of the at least one notch are separate and continuous surfaces.*

*235. The brush according to claim 233, wherein the elongate core defines an axis of the brush, and wherein a height of the front face of the at least one notch varies along the axis and a height of the back face of the at least one notch varies along the axis.*

*236. The brush according to claim 233, wherein the intersection of the outer edge of the front face of the at least one notch with the envelope surface defines a peak ridge.*

*237. The brush according to claim 236, wherein the peak ridge forms a vertex of an emergent angle α, and wherein the front and back faces of the at least one notch form a reentrant angle β of between 60° and 180° at any point along the trough line.*

*238. The brush according to claim 233, wherein the core is formed by the spiral winding of two branches of a wire, and wherein the bristles are clamped between the wound branches of the core.*

*239. The brush according to claim 233, wherein the front and back faces of the at least one notch extend from one end of the brush to the other.*

*240. The brush according to claim 233, wherein the front and back faces of the at least one notch extend along only a part of a length of the brush.*

*241. The brush according to claim 237, wherein the reentrant angle is between 90° and 160°.*

*242. The brush according to claim 233, wherein at least one of the front face and the back face of the at least one notch is planar.*

*243. The brush according to claim 242, wherein the front face of the at least one notch is planar.*

*244. The brush according to claim 233, wherein the back face of the at least one notch is convex.*

*245. The brush according to claim 243, wherein the back face of the at least one notch is planar.*

*246. The brush according to claim 243, wherein the back face of the at least one notch is convex.*

*247. The brush according to claim 233, wherein a height of the front face of each notch is less than a height of the corresponding back face of each notch.*

*248. The brush according to claim 247, wherein the height of the front face of each notch is less than ⅔ of the height of the corresponding back face of each notch.*

*249. The brush according to claim 233, wherein a cross-section of the brush is substantially rectangular.*

*250. The brush according to claim 233, wherein a cross-section of the brush is substantially circular.*

*251. The brush according to claim 237, wherein the emergent angle α is constant over the entire length of the brush.*

*252. The brush according to claim 237, wherein the reentrant angle β is constant from one end of the brush to the other.*

*253. The brush according to claim 233, wherein the trough line is straight.*

*254. The brush according to claim 233, wherein the trough line is curved.*

*255. The brush according to claim 236, wherein the peak ridge is straight.*

*256. The brush according to claim 236, wherein the peak ridge is curved.*

*257. The brush according to claim 233, wherein the back face of the at least one notch is rounded and has a radius such that the back face is tangent to the envelope surface of the brush.*

*258. The brush according to claim 233, wherein the at least one notch comprises a plurality of said notches.*

*259. The brush according to claim 258, wherein the notches are adjacent to one another.*

*260. The brush according to claim 258, wherein the notches are regularly spaced.*

*261. The brush according to claim 233, wherein the trough line extends over only a part of a length of the brush.*

*262. A make-up device comprising:*

*a reservoir for containing a make-up product;*

*a wiping member associated with the reservoir; and*

*the brush according to claim 233.*

*263. The make-up device of claim 262, further comprising mascara contained in the reservoir.*

*264. A brush comprising:*

*an elongate core;*

*bristles extending from said core, ends of said bristles defining an external surface of the brush; and*

*at least two notches on the external surface of the brush, the at least two notches each comprising a front face, a back face, and a trough line, the back face being at least in part non-concave and asymmetric with respect to the front face,*

*wherein the front and back faces of each of the at least two notches intersect one another at the trough line that is spaced away from the core, the trough line extending in a direction non-perpendicular to the length of said elongate core, and*

*wherein an outer edge of the front face of one notch intersects with the back face of a second notch, and*

*wherein the back face of the one notch intersects with an outer edge of the front face of another notch.*

*265. The brush according to claim 264, wherein the front and back faces of the at least two notches are separate and continuous surfaces.*

*266. The brush according to claim 264, wherein said another notch is said second notch.*

*267. The brush according to claim 264, wherein said another notch is not said second notch.*

*268. The brush according to claim 264, wherein the elongate core defines an axis of the brush, and wherein a height of the front face of the at least two notches varies along the axis and a height of the back face of the at least two notches varies along the axis.*

*269. The brush according to claim 264, wherein the intersection of the outer edge of the front face of the one notch and the back face of the second notch defines a peak ridge.*

*270. The brush according to claim 269, wherein the peak ridge forms a vertex of an emergent angle α, and wherein the front and back faces of the at least two notches form a reentrant angle β of between 60° and 180° at any point along the trough line.*

*271. The brush according to claim 264, wherein the core is formed by the spiral winding of two branches of a wire, and wherein the bristles are clamped between the wound branches of the core.*

*272. The brush according to claim 264, wherein the front and back faces of the at least two notches extend from one end of the brush to the other.*

*273. The brush according to claim 264, wherein the front and back faces of the at least two notches extend along only a part of a length of the brush.*

*274. The brush according to claim 270, wherein the reentrant angle is between 90° and 160°.*

*275. The brush according to claim 264, wherein at least one of the front face and the back face of the at least two notches is planar.*

*276. The brush according to claim 275, wherein the front face of the at least two notches is planar.*

*277. The brush according to claim 264, wherein the back face of the at least two notches is convex.*

*278. The brush according to claim 276, wherein the back face of the at least two notches is planar.*

*279. The brush according to claim 276, wherein the back face of the at least two notches is convex.*

*280. The brush according to claim 264, wherein a height of the front face of each notch is less than a height of the corresponding back face of each notch.*

*281. The brush according to claim 280, wherein the height of the front face of each notch is less than ⅔ of the height of the corresponding back face of each notch.*

*282. The brush according to claim 264, wherein a cross-section of the brush is substantially rectangularly shaped.*

*283. The brush according to claim 264, wherein a cross-section of the brush is substantially circularly shaped.*

*284. The brush according to claim 270, wherein the emergent angle α is constant over the entire length of the brush.*

*285. The brush according to claim 270, wherein the reentrant angle β is constant from one end of the brush to the other.*

*286. The brush according to claim 264, wherein the trough line is straight.*

*287. The brush according to claim 264, wherein the trough line is curved.*

*288. The brush according to claim 269, wherein the peak ridge is straight.*

*289. The brush according to claim 269, wherein the peak ridge is curved.*

*290. The brush according to claim 264, wherein ends of the longest of the bristles define an envelope surface of the brush, and wherein the back face of at least one of the at least two notches is rounded and has a radius such that the back face is tangent to the envelope surface of the brush.*

*291. The brush according to claim 264, wherein the notches are adjacent to one another.*

*292. The brush according to claim 264, wherein the notches are regularly spaced.*

*293. The brush according to claim 264, wherein the trough line extends over only a part of a length of the brush.*

*294. A make-up device comprising:*

*a reservoir for containing a make-up product;*

*a wiping member associated with the reservoir; and*

*the brush according to claim 264.*

*295. The make-up device of claim 294, further comprising mascara contained in the reservoir.*

*296. The brush according to claim 1, wherein a cross-section of the envelope has a substantially circular shape.*

*297. The make-up device according to claim 25, wherein a cross-section of the envelope surface has a substantially circular shape.*

*298. The brush according to claim 26, wherein a cross-section of the envelope surface has a substantially circular shape.*

*299. The make-up device according to claim 27, wherein a cross-section of the envelope surface has a substantially circular shape.*

*300. The brush according to claim 28, wherein a cross-section of the envelope surface has a substantially circular shape.*

*301. The make-up device according to claim 29, wherein a cross-section of the envelope surface has a substantially circular shape.*

*302. The brush according to claim 86, wherein a cross-section of the envelope surface has a substantially circular shape.*

*303. The brush according to claim 129, wherein a cross-section of the envelope surface has a substantially circular shape.*

*304. The brush according to claim 170, wherein a cross-section of the envelope surface has a substantially circular shape.*

*305. The brush according to claim 201, wherein ends of the longest of the bristles define an envelope surface of the brush, and wherein a cross-section of the envelope surface has a substantially circular shape.*

*306. The brush according to claim 233, wherein a cross-section of the envelope surface has a substantially circular shape.*

*307. The brush according to claim 264, wherein ends of the longest of the bristles define an envelope surface of the brush, and wherein a cross-section of the envelope surface has a substantially circular shape.*

*308. The brush according to claim 1, wherein at least a portion of the envelope surface has a substantially cylindrical shape.*

*309. The make-up device according to claim 25, wherein at least a portion of the envelope surface has a substantially cylindrical shape.*

*310. The brush according to claim 26, wherein at least a portion of the envelope surface has a substantially cylindrical shape.*

*311. The make-up device according to claim 27, wherein at least a portion of the envelope surface has a substantially cylindrical shape.*

*312. The brush according to claim 28, wherein at least a portion of the envelope surface has a substantially cylindrical shape.*

*313. The make-up device according to claim 29, wherein at least a portion of the envelope surface has a substantially cylindrical shape.*

*314. The brush according to claim 86, wherein at least a portion of the envelope surface has a substantially cylindrical shape.*

*315. The brush according to claim 129, wherein at least a portion of the envelope surface has a substantially cylindrical shape.*

*316. The brush according to claim 170, wherein at least a portion of the envelope surface has a substantially cylindrical shape.*

*317. The brush according to claim 201, wherein ends of the longest of the bristles define an envelope surface of the brush, and wherein at least a portion of the envelope surface has a substantially cylindrical shape.*

*318. The brush according to claim 233, at least a portion of the envelope surface has a substantially cylindrical shape.*

*319. The brush according to claim 264, wherein ends of the longest of the bristles define an envelope surface of the brush, and wherein at least a portion of the envelope surface has a substantially cylindrical shape.*

*320. The brush according to claim 1, wherein at least a portion of the envelope surface has a substantially conical shape.*

*321. The make-up device according to claim 25, wherein at least a portion of the envelope surface has a substantially conical shape.*

*322. The brush according to claim 26, wherein at least a portion of the envelope surface has a substantially conical shape.*

*323. The make-up device according to claim 27, wherein at least a portion of the envelope surface has a substantially conical shape.*

*324. The brush according to claim 28, wherein at least a portion of the envelope surface has a substantially conical shape.*

*325. The make-up device according to claim 29, wherein at least a portion of the envelope surface has a substantially conical shape.*

*326. The brush according to claim 86, wherein at least a portion of the envelope surface has a substantially conical shape.*

*327. The brush according to claim 129, wherein at least a portion of the envelope surface has a substantially conical shape.*

*328. The brush according to claim 170, at least a portion of the envelope surface has a substantially conical shape.*

*329. The brush according to claim 201, wherein ends of the longest of the bristles define an envelope surface of the brush, and wherein at least a portion of the envelope surface has a substantially conical shape.*

*330. The brush according to claim 233, wherein at least a portion of the envelope surface has a substantially conical shape.*

*331. The brush according to claim 264, wherein ends of the longest of the bristles define an envelope surface of the brush, and wherein at least a portion of the envelope surface has a substantially conical shape.*

*332. A brush comprising:*

*an elongate core;*

*bristles extending from said core, ends of said bristles defining an external surface of the brush, the ends of the longest of the bristles defining an envelope surface of the brush; and*

*at least two notches on the external surface of the brush, the at least two notches each comprising a front face, a back face, and a trough line, the back face being non-concave and asymmetric with respect to the front face,*

*wherein the front and back faces of each of the at least two notches intersect one another at the trough line that is spaced away from the core,*

*wherein an outer edge of the front face of one notch intersects with the envelope surface of the brush, and*

*wherein the back face of the one notch intersects with an outer edge of the front face of another notch.*

*333. A brush comprising:*

*an elongate core;*

*bristles extending from said core, ends of said bristles defining an external surface of the brush, the ends of the longest of the bristles defining an envelope surface of the brush; and*

*at least two notches on the external surface of the brush, the at least two notches each comprising a front face, a back face, and a trough line, the back face being at least in part non-concave and asymmetric with respect to the front face,*

*wherein the front and back faces of each of the at least two notches intersect one another at the trough line that is spaced away from the core, the trough line extending in a direction non-perpendicular to the length of said elongate core, and*

*wherein an outer edge of the front face of one notch intersects with the envelope surface of the brush, and*

*wherein the back face of the one notch intersects with an outer edge of the front face of another notch.*

*334. A brush comprising:*

*an elongate core;*

*bristles extending from said core, ends of said bristles defining an external surface of the brush, the ends of the longest of the bristles defining an envelope surface of the brush; and*

*at least two notches on the external surface of the brush, the at least two notches each comprising a front face, a back face, and a trough line, the back face being non-concave and asymmetric with respect to the front face,*

*wherein the front and back faces of each of the at least two notches intersect one another at the trough line that is spaced away from the core,*

*wherein an outer edge of the front face of one notch intersects with the back face of a second notch, and*

*wherein the back face of the one notch intersects with the envelope surface of the brush.*

*335. A brush comprising:*

*an elongate core;*

*bristles extending from said core, ends of said bristles defining an external surface of the brush, the ends of the longest of the bristles defining an envelope surface of the brush; and*

*at least two notches on the external surface of the brush, the at least two notches each comprising a front face, a back face, and a trough line, the back face being at least in part non-concave and asymmetric with respect to the front face,*

*wherein the front and back faces of each of the at least two notches intersect one another at the trough line that is spaced away from the core, the trough line extending in a direction non-perpendicular to the length of said elongate core, and*

*wherein an outer edge of the front face of one notch intersects with the back face of a second notch, and*

*wherein the back face of the one notch intersects with the envelope surface of the brush.*

*336. The brush according to claim 332, wherein the core comprises is formed by the spiral winding of two branches of a wire, and wherein the bristles are clamped between the wound branches of the core.*

*337. The brush according to claim 333, wherein the core comprises is formed by the spiral winding of two branches of a wire, and wherein the bristles are clamped between the wound branches of the core.*

*338. The brush according to claim 334, wherein the core comprises is formed by the spiral winding of two branches of a wire, and wherein the bristles are clamped between the wound branches of the core.*

*339. The brush according to claim 335, wherein the core comprises is formed by the spiral winding of two branches of a wire, and wherein the bristles are clamped between the wound branches of the core.*

* * * * *

UNITED STATES PATENT AND TRADEMARK OFFICE

CERTIFICATE OF CORRECTION

PATENT NO. : RE 41,156 E
APPLICATION NO. : 09/899182
DATED : March 2, 2010
INVENTOR(S) : Jean-Louis H. Gueret It is certified that error appears in the above-identified patent and that said Letters Patent is hereby corrected as shown below:

In claim 29, column 9, line 19, delete "a notch".

In claim 29, column 9, line 22, "said" should read -- the --.

In claim 29, column 9, line 26, "forms" should read -- form --.

In claim 296, column 21, line 26, after "envelope" insert -- surface --.

Signed and Sealed this

First Day of June, 2010

David J. Kappos

David J. Kappos
*Director of the United States Patent and Trademark Office*